Figure 1:
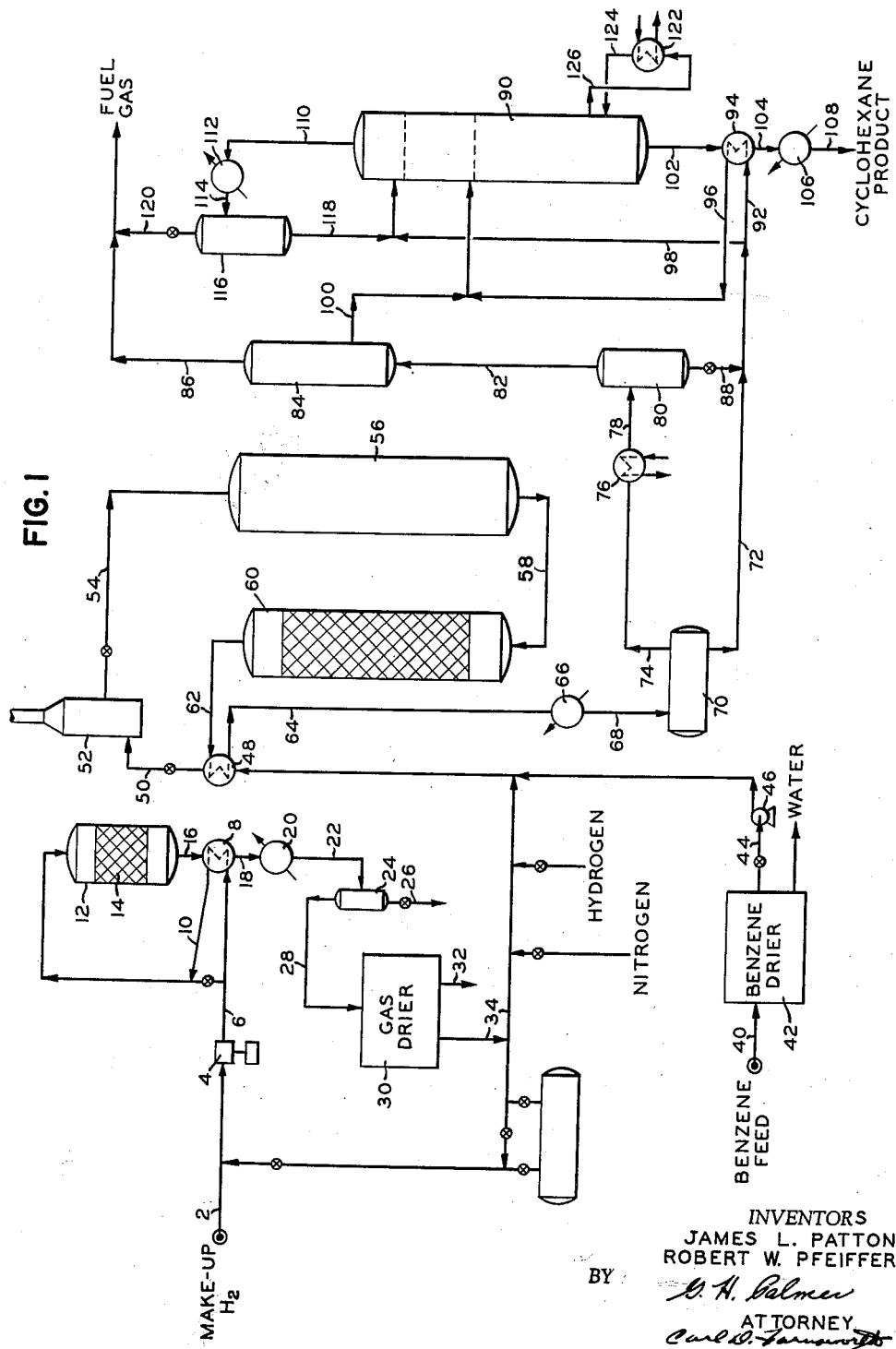

Dec. 25, 1962 R. W. PFEIFFER ET AL 3,070,640
PREPARATION OF CYCLOHEXANE
Filed Dec. 29, 1958 2 Sheets-Sheet 1

INVENTORS
JAMES L. PATTON
ROBERT W. PFEIFFER
BY
ATTORNEY
AGENT

Dec. 25, 1962   R. W. PFEIFFER ET AL   3,070,640
PREPARATION OF CYCLOHEXANE
Filed Dec. 29, 1958   2 Sheets-Sheet 2

INVENTORS
JAMES L. PATTON
ROBERT W. PFEIFFER
BY *W. H. Palmer*
ATTORNEY
*Carl D. Farnsworth*
AGENT United States Patent Office 3,070,640
Patented Dec. 25, 1962

3,070,640
PREPARATION OF CYCLOHEXANE
Robert W. Pfeiffer, Bronxville, N.Y., and James L. Patton, Ramsey, N.J., assignors to The M. W. Kellogg Company, Jersey City, N.J., a corporation of Delaware
Filed Dec. 29, 1958, Ser. No. 783,301
8 Claims. (Cl. 260—667)

This invention relates to a method for the production of substantially pure cyclohexane. More particularly, the invention is directed to a method for controlling the exothermic reaction temperature whereby substantially pure benzene feed is all converted to substantially pure cyclohexane.

Many catalytic hydrogenation reactions, such as the vapor phase hydrogenation of aromatics including benzene, naphthalene and their derivatives or homologues are exothermic reactions and require very careful heat control to keep the catalyst and reaction conditions within their effective hydrogenation range to produce the desired product. Close control of temperatures requiring the rapid removal of large quantities of heat from the catalyst in order to avoid development of hot spots which cause deterioration of the catalyst and in order to avoid objectionable side reactions which result in a product of undesired purity.

Various methods for controlling the temperature of the catalyst in hydrogenation reactions have been suggested and utilized in the prior art. These quite often involve the use of elaborate heat exchange type converters of suitable design which employ heat transfer media such as water, mercury and other heat transfer fluids. Furthermore, manipulative steps such as introducing the reactant material in stages with cooling between stages or the use of inert gaseous material diluents have previously been employed which, for the most part, because of economical considerations, have not been completely satisfactory to the petroleum refiner. The difficulty with the prior art methods is that no matter how effective a heat transfer medium is employed, the maximum efficiency of the heat exchange converter is limited by the rate at which heat may be dissipated from the catalyst. The more rapid the exothermic reaction, the more difficult the heat removal becomes. Accordingly, elaborate reactor designs employing a plurality of small tubes, say about one inch or less in diameter, in which the catalyst is distributed with reference to the heat transfer fluid are employed such that the heat of reaction need only travel through a small layer of catalyst to reach the heat transfer fluid. Thus it has been necessary in the prior art systems to employ elaborate and complicated reactor design equipment to accommodate the dissipation of heat which has not been completely satisfactory.

Accordingly, the present invention is directed to an improved method for controlling highly exothermic hydrocarbon or other chemical conversion reactions.

Another object of the invention is to provide a process for the hydrogenation of benzene to cyclohexane, whereby production of undesirable side products of reaction are minimized.

Other objects and advantages obtained from the process of this invention will become apparent from the following description.

Broadly, this invention is directed to the method for controlling temperatures in highly exothermic reactions employing a known catalyst in a novel and improved manner.

Specifically, the process of this invention is directed to the catalytic hydrogenation of a high purity benzene feedstock to produce 99+% purity cyclohexane. The process described herein includes three distinct sections, namely (1) methanation and drying, (2) hydrogenation, and (3) product recovery. Fresh benzene feed is dried and combined with a hydrogen-rich make-up gas which has been methanated and dried to remove potential catalyst poisons. Cyclohexane production is accomplished by the hydrogenation of benzene over a catalyst comprising a group VIII hydrogenating metal on a suitable carrier material in the presence of excess hydrogen with the reactant flow being on a once through basis. The products of reaction are cooled and the liquid product is sent to a product recovery stripper for removal of light components. Refrigeration of the net tail gas stream is used to increase cyclohexane product recovery.

In one embodiment, the invention is directed to the method of hydrogenating benzene in the presence of a hydrogenating metal component supported on a suitable carrier material arranged to effectively control the exothermic reaction temperature within preselected reaction conditions. That is, a tube or reactor containing a plurality of parallel arranged reaction tubes surrounded by a suitable heat exchange medium such as water is provided. Each of these reaction tubes is filled with a mass of catalyst such that the reactant material comprising a mixture of benzene and hydrogen first contacts a mass of catalyst containing a small percentage or very minor amount of active hydrogenating metal component and then a mass of catalyst containing a greater amount of hydrogenating metal component with at least the first catalyst mass being in indirect heat exchange with the heat exchange medium. Thereafter, the product effluent containing the remaining unreacted benzene and hydrogen is passed through a second heat exchange reaction zone or an adiabatic reactor containing a bed of active hydrogenating catalyst. A fluid or fixed bed of catalyst may be employed in the adiabatic reactor. Because of the highly exothermic reaction being considered herein, it is essential that the initial contact of the reactant material be effected with a dilute catalyst phase, that is, a mass of catalyst containing a very small percentage of hydrogenating component under conditions whereby the exothermic reaction temperature will be effectively controlled below about 650° F., or until in the order of about 80% to about 98% conversion of the reactant material is completed and thereafter contacting the reactant material with a more active catalyst mass containing a greater percentage of hydrogenating metal component while controlling the temperature below about 620° F., until about 99.9% of the benzene feed is converted to the desired product. By this novel and improved method of sequentially effecting the initial phases of the hydrogenation reaction, desired temperature profiles below equilibrium temperatures are readily maintained and undesirable side reactions, such as the isomerization of cyclohexane to methylcyclopentane is substantially minimized.

The relative size of the reactor tubes, length and diameter, number of tubes employed in the reactor and depth of the dilute hydrogenating metal component phase with respect to the more dense hydrogenating metal component phase is predetermined as a function of the desired conversion and allowable temperature level for the particular reaction under consideration.

To accomplish the above, it is contemplated within the scope of this invention to employ a catalyst comprising from about 0.006% to about 0.6% by weight of a hydrogenating metal component on a carrier material such as alumina or other suitable carrier material, either with or without an inert diluent material to obtain the desired concentration of hydrogenating metal component in the respective contact zones. That is, in a specific embodiment, the total mass of catalyst first to be contracted in the tubes with the material to be hydrogenated will contain from about 0.006% to about .06% by weight platinum and preferably not more than about .03% by weight platinum for that volume of the reaction zone required to avoid excessive temperatures in the more concentrated catalyst phase adjacent the reactor outlet which has from about 0.1% to about 1.0% by weight platinum and preferably not more than about 0.6% by weight platinum. Thereafter, the total effluent comprising product material, unreacted reactant and hydrogen may be passed to an adiabatic reaction zone in contact with a catalyst comprising about 0.6% by weight platinum on alumina to complete the conversion of the reactant material.

In a specific embodiment of the present invention, cyclohexane of about 99.95% purity is produced by passing a mixture of benzene and hydrogen gas in a molal ratio of from about 15 to about 4 to 1, preferably about 11 to 1, at a temperature of from about 350° F. to about 680° F., preferably about 450° F. to about 660° F., and a pressure of from about 300 p.s.i.g., to about 600 p.s.i.g., preferably about 350 p.s.i.g., in contact with a dilute phase hydrogenation catalyst in a reaction zone wherein the first portion or inlet portion of the tubular reactor is filled with a platinum-alumina catalyst comprising about .03% by weight platinum and thereafter the reactant material and products of the first phase reaction pass through a more active catalyst mass having about 0.6% by weight platinum. The products from the tubular reactor stage of this process may then be passed through an adiabatic reactor containing a bed of platinum catalyst comprising about 0.6% by weight of platinum to complete the conversion of benzene introduced to the process.

Upon introducing the reactant material to the tubular reactor containing the hydrogenation catalyst, the temperature of the reaction, unless carefully controlled, rapidly increases and will approach equilibrium temperature leading to undesired side reactions as the benzene feed is hydrogenated to cyclohexane. Accordingly, it is essential, as hereinbefore indicated, that the temperature of the exothermic reaction be effectively controlled within the desired limits and particularly kept below equilibrium temperatures until the major portion of the benzene feed has been converted to cyclohexane, that is, below a temperature of about 620° F. Controlling the severity of reaction by employing a less active catalyst phase followed by a more active catalyst phase, applicants were able to effectively control the temperature profile for the exothermic reaction within desired conditions thereby avoiding the undesirable side reactions herein referred to. After substantially complete hydrogenation of the reactants, the products are withdrawn from the concentrated catalyst contacting zone and subsequently cooled. The cooled effluent stream is passed into a suitable receiver in which the effluent separates into a gaseous phase rich in hydrogen and a liquid product phase which is rich in cyclohexane.

In starting up the process of this invention, the methanation and hydrogenation catalyst will require a preliminary reduction with hydrogen prior to being placed on stream. To accomplish the pretreatment for starting up the process, the reactor circuit is first evacuated by means of a jet ejector not shown. Nitrogen from any suitable source such as bottled nitrogen is then used in successive repressuring steps to atmospheric pressure and evacuation to 25 inches mercury vacuum to remove oxygen and air from the system. Following the last evacuation, the system is then pressurized to about 25 p.s.i.g., or higher with hydrogen-rich gas. The methanation reactor circuit is is then lined up to internally recirculate hydrogen through the furnace and back to the methanation reactor. The reduction of the methanation catalyst is accomplished by passing the hydrogen-rich gas at a temperature of about 700° F. to about 750° F., through the reactor for a period of time amounting to about 16 hours and thereafter the catalyst bed is cooled to reaction temperature of about 580° F., at which time it is ready to be placed on stream.

In addition, a portion of the hydrogen gas at a temperature of about 700° F. to about 750° F., recovered from the furnace is passed through the hydrogenation reactors for reduction of the catalyst and then diverted back to the methanation reactor outlet to be combined with the hydrogen gases discharged therefrom. By this arrangement only the furanace and reactors of the hydrogenation circuit are exposed to the high temperature pretreatment step. During this pretreat operation, the shell side of the hydrogenation reactor is cooled with a suitable cooling gas, such as purge steam. Normally this pretreatment will take of the order of about 16 hours to be accomplished. Following the hydrogen pretreatment step, the reactor is cooled to the desired operating temperature of about 480° F. Thereafter make-up hydrogen-rich gas may then be slowly admitted to the methanation circuit in accordance with the normal processing scheme and the system pressure built up to about 335 p.s.i.g. with the methanated and dried hydrogen. For simplicity, the above description assumed the use of bottled hydrogen for the initial start-up, however, on subsequent start-ups the reserve of dried and methanated hydrogen stored in suitable hydrogen surge drums may be used in place of the bottled hydrogen.

In another embodiment, the initial start-up may be accomplished with the use of make-up hydrogen to first partially reduce the methanation catalyst and then to build a reserve of dried and methanated hydrogen. With this hydrogen reserve, the catalyst reduction procedure then follows the steps previously outlined.

In the process of this invention it is not expected that regeneration of the methanation and platinum catalyst will be required very often since it is primarily a non-regenerative process for at least a long period of time amounting to approximately two years. However, if it becomes necessary to shut-down the process for any particular reason such as to open the reactors for inspection and change the catalyst loading in the reactors, it is necessary to first oxidize the catalyst to avoid danger of ignition upon exposure to air. Accordingly, somewhat identical procedures are used to either oxidize or regenerate the catalyst when desired. When the reactant feed material such as benzene is shut off or cut out of the process, the reactors are purged of hydrocarbons using hydrogen from the process. The reactor circuits are then depressured and evacuated by the ejector previously mentioned. Bottled nitrogen is then used in successive repressurings to atmospheric pressure and evacuations to 25 inches of mercury vacuum in order to reduce the hydrocarbon partial pressure. Following the last evacuation the system is repressured to 25 p.s.i.g. with nitrogen at which time any hydrocarbon present in the system should be reduced to at least about 0.005 mole percent.

The nitrogen is used as a coolant during reactor regeneration in order to limit the temperature rise during combustion of hydrocarbons and any carbonaceous materials on the catalyst. The nitrogen may be recirculated through the methanation and reactor circuit using the same process equipment line-up as during the catalyst pretreat operation previously described.

Regeneration of the catalyst is accomplished by slowly admitting air to the furnace outlet while the circulating nitrogen is heated to about 650° F. by the furnace. The oxygen content of the stream then entering the reactor is maintained at about 0.5 mole percent or as required to limit the temperature rise in the catalyst bed to not more than about 100° F. The air or oxygen-containing gas admitted to the system is allowed to build the system pressure to a maximum of from about 85 to about 100 p.s.i.g. When no appreciable temperature rise is obtained across the catalyst bed at the 650° F. inlet condition temperature, the reactor inlet temperature is then raised to about 700° F., while the oxygen content is still maintained at about 0.5 mole percent. In the final stage of regeneration, the oxygen content of the regeneration gas is held to about 0.5% and the reactor inlet temperature is raised to about 750° F. At the conclusion of the regeneration technique outlined above the catalyst in the reactor is gradually cooled.

Any suitable hydrogenation catalyst may be used for the present invention including nickel, platinum, palladium, rhodium, iron or those well known in the art; Raney nickel or very active hydrogenating catalyst which is composited with a suitable carrier such as alumina, silica, kieselguhr, diatomaceous earth, magnesia, zirconia or other inorganic oxides, either alone or in combination. The preferred catalyst of this invention comprises platinum composited with alumina and may be prepared by any of the well known methods of the prior art.

The process of this invention may be best explained by specific reference to the accompanying drawing which illustrates by way of example the method for carrying out the process of this invention and is not intended to unduly limit the scope of the invention to the specific embodiments illustrated, since it has wide application in the field of petroleum refining and chemical processing.

The drawings present diagrammatically the process flow arrangement for carrying out the process of this invention.

Referring now to FIGURE 1, by way of example, for practicing the process of this invention, a hydrogen-rich gas stream obtained from a suitable source such as for example, an ethylene unit, and containing appreciable amounts of CO and $O_2$ is passed by conduit 2 to a compressor 4 wherein the pressure of the hydrogen-rich stream is raised to about 420 p.s.i.g. The thus pressurized hydrogen-rich stream at a temperature of about 300° F. is passed by conduit 6 to a heat exchanger 8 wherein the hydrogen-rich stream is preheated by indirect heat exchange with the methanation reactor effluent more fully described hereinafter. The preheated hydrogen-rich stream at a temperature of about 580° F. is then passed by conduit 10 to methanation reactor 12. In methanation reactor 12 a bed of nickel methanation catalyst 14 is employed to cause a plurality of hydrogenation reactions to convert the undesired products accompanying the hydrogen-rich gas stream. These reactions are, for example, conversion of CO to $CH_4$ and $H_2O$, $O_2$ to $H_2O$ and $C_2H_4$ to $C_2H_6$. The overall reaction is exothermic, thereby increasing the temperature in the methanation reactor to a temperature of about 700° F. at the reactor outlet. The reactor effluent is withdrawn by conduit 16 and passed to heat exchanger 8 wherein it gives up heat to the hydrogen-rich stream as hereinbefore described, thereby cooling the reactor effluent to a temperature of about 498° F. The cooled reactor effluent is then passed by conduit 18 to a cooler 20 wherein it is further cooled to a temperature of about 110° F. and is then passed by conduit 22 to drum 24, wherein condensed water is separated and removed by conduit 26. The gaseous stream substantially free of entrained water is then passed by conduit 28 to a suitable drying apparatus 30 for the removal of water of saturation with the water being removed from the drier by conduit 32. The hydrogen-rich gas essentially free of CO, $O_2$ and $H_2O$ is then withdrawn by conduit 34 with a portion of this gas stream passed to the hydrogenation reactor wherein a catalyst comprising platinum is employed. In essence, the methanation reactor 12 may be referred to as a guard chamber since it protects the platinum catalyst employed in the hydrogenation reactor against the presence of CO and $O_2$, as well as $H_2O$, the latter of which tends to poison the platinum catalyst. In addition, since no undesirable side reactions are encountered in the methanation reactor a long catalyst life is obtained amounting to years before the catalyst must be treated or replaced. A high purity benzene feed obtained from a suitable source is passed by conduit 40 to a suitable drier 42 for the removal of soluble water and the thus treated benzene feed is then passed by conduit 44 containing pump 46 for admixture with a portion of the hydrogen-rich gas in conduit 34. The benzene feed and hydrogen-rich gas in the ratio of about 11 moles of total gas per mole of benzene feed are combined and passed to heat exchanger 48 in heat exchange with the hydrogenation reactor effluent more fully described hereinafter wherein the combined feed is preheated to a temperature of about 325° F. The thus preheated benzene feed admixed with hydrogen-rich gas and at a pressure of about 365 p.s.i.g. is passed by conduit 50 to furnace 52 wherein the combined stream is heated to a temperature of about 450° F. and the thus heated stream is then passed by conduit 54 to tubular reactor 56. In tubular reactor 56 the principal reaction is the higher exothermic hydrogenation of benzene to form cyclohexane. In addition, any small amounts of toluene found in the feed is hydrogenated to form methylcyclohexane. A side reaction which may occur if not carefully controlled and to which in one embodiment this invention is directed relates to the isomerization of cyclohexane to form the undesirable compound, methylcyclopentane. This is of extreme importance because the only impurities present in the final cyclohexane product are those due to the formation of methylcyclopentane, methylcyclohexane and unconverted benzene. Accordingly, the reactor design and sequence of steps employed to effect the hydrogenation of benzene to cyclohexane has been directed to the production of 99.95% conversion of benzene to cyclohexane. While only one tubular reactor has been shown in the drawing, it is to be understood that a plurality of parallel arranged tubular reactors may be provided in order to stay within certain mechanical limitations for this type of reactor and to provide for future flexibility in replacing catalyst. Generally, the hydrocarbon flow is through a plurality of catalyst packed two-inch diameter tubes with steam generation on the shell side of the tubes. By the improved reactor design and arrangement previously described, the steam generation effectively removes the heat of reaction and permits selective and careful control of the reactant temperature and particularly the reactor outlet temperature which is of extreme importance because the actual conversion obtained near the reactor outlet is essentially identical to equilibrium conversion at reactor outlet temperatures. As previously mentioned, a catalyst at the reactor inlet has been selected to provide a platinum-containing catalyst having the desired percentage by weight of platinum as a means of limiting peak reactor temperatures, thereby avoiding the undesirable isomerization of cyclohexane to form methylcyclopentane. In addition to the tubular reactor discussed above, an adiabatic reactor may be provided in sequence with the tubular reactor for completing the final conversion of unreacted benzene to the desired cyclohexane product. Accordingly, the tubular reactor effluent is passed by conduit 58 to adiabatic reactor 60. From adiabatic reactor 60 the reactor effluent is passed by conduit 62 to heat exchanger 48 wherein the reactor effluent at a temperature of about 480° F. and a pressure of about 335 p.s.i.g. gives up heat to the feed mixture passed thereto by conduit 34. The thus partially cooled reactor effluent at a temperature of about 206° F. is passed by conduit 64 to cooler 66 wherein it is cooled to about 110° F. and passed by conduit 68 to flash drum 70. In flash drum 70 maintained at a temperature of about 110° F. and a pressure of about 315 p.s.i.g., the reactor effluent is flashed with the liquid product withdrawn by conduit 72 for passage to a product stripper discussed more fully hereinafter. The vapor is recovered from drum 70 by conduit 74, cooled to about 45° F., in cooler 76 and then conveyed by conduit 78 to flash drum 80 wherein it is flashed at a pressure of about 305 p.s.i.g. in order to increase cyclohexane recovery. A portion of the vapor recovered from drum 70 may be recycled to conduit 44 in order to obtain the most favorable equilibrium temperature profile. Vapors from flash step 80 are withdrawn by conduit 82 and passed to an absorption zone 84 such as a charcoal absorber for the recovery of $C_2H_6$ from the vaporous product. The thus treated vapora pressure of about 245 p.s.i.g. and a bottom temperature of about 425° F.

Figure 2:
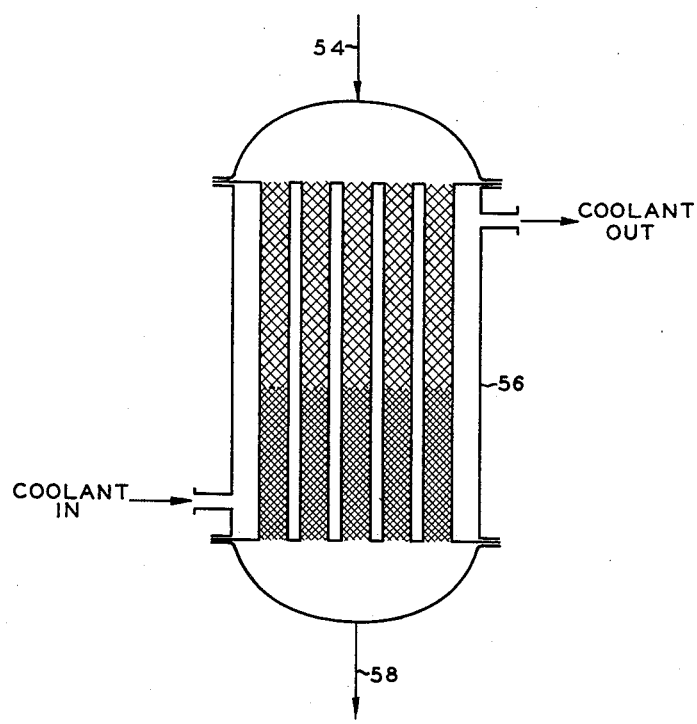

FIGURE 2 illustrates, more specifically a tubular reactor 56 containing a plurality of parallel arranged tubes filled with catalytic material in accordance with this invention wherein the tubes are in indirect heat exchange with a suitable cooling fluid introduced and withdrawn from reactor 56 as shown. Conduits 54 and 58 correspond to the conduits as described in connection with FIGURE 1.

Having thus specifically described the process of this invention, reference is now had by way of example to the table below which presents the results of an investigation to determine an effective method for controlling highly exothermic reactions within desired temperature limits.

TABLE

*Results of Cyclohexane Reactor Investigation*

| Catalyst Strength | Operation | Moles Recycle Per Mol F.F. | Pressure, P.s.i.a. | Temp., ° F. | #/Hr. of MCP at Percent F.F. Benzene Conversion |
|---|---|---|---|---|---|
| Commercial Platinum-Alumina Catalyst With Alternate Layers Of Inert Granular Material For Cooling. | 1. Once-Thru $H_2$ (inert cooling) | | 550 | 680 peak | 42 #/hr. at 99.94%. |
| | 2. Recycle Gas (inert cooling) | 4.6 | 550 | 740 peak | 33 #/hr. at 44%. |
| | | | | 530 | 43#/hr. at 99.94%. |
| | 3. Recycle Liquid | 0.84 | 350 | 706 peak | 27 #/hr. at 35.5%. |
| | | | | 680 | 317 #/hr. at 57%. |
| | 4. Recycle Gas and Liquid | 5.2 gas / 0.84 liq. | 380 | 669 peak | 11 #/hr. at 47%. |
| | | | | 643 | 102 #/hr. at 72%. |
| | 5. Recycle Gas | 7.05 | 550 | 712 peak | 8 #/hr. at 65%. |
| | | | | 620 | 54 #/hr. at 97.5%. |
| | 6. Recycle Gas | 4.03 | 350 | 703 peak | 24 #/hr. at 41%. |
| | | | | 691 | 132 #/hr. at 55%. |
| Dilute Catalyst | 7. Recycle Gas | 4.03 | 350 | 655 peak | 3 #/hr. at 52.5%. | ous product is then removed by conduit 86 and removed as fuel gas. In flash drum 80 the recovered liquid is withdrawn by conduit 88, combined with the recovered liquid from drum 70 in conduit 72 and passed at a combined temperature of about 103° F. to product stripper 90. In accordance with applicants' specific mode of operation, the combined liquid product stream is split such that the major portion of the stream, amounting to about 68%, is passed by conduit 92 to a heat exchanger 94 wherein the temperature of the stream is elevated to a temperature of about 300° F. Thereafter, the stream is passed by conduit 96 to stripper 90 with the minor portion of the combined stream amounting to about 32% being passed by conduit 98 to the upper portion of the stripper 90. In addition to the above, the cyclohexane product separated by charcoal absorber 84 is recovered and passed by conduit 100 and combined with the product stream in conduit 96 passed to the stripper. Accordingly, the total liquid product from the hydrogenation section is passed to a stripper 90 wherein light ends such as $C_2$ and lighter which enter the system with the hydrogen-rich gas are separated from the cyclohexane product. The stripped bottoms withdrawn by conduit 102 are heat exchanged with a portion of the tower feed as hereinbefore described to cool the bottoms in heat exchanger 94 to about 313° F., thereafter the thus cooled bottoms are passed by conduit 104 to cooler 106 for further cooling to a temperature of about 110° F. and sent to tankage or storage by conduit 108 as a high purity cyclohexane product (99+). The stripped tower overhead is withdrawn by conduit 110, cooled in cooler 112 to a temperature of about 110° F. and passed by conduit 114 to drum 116 wherein condensed cyclohexane is recovered and returned to the stripper tower 90 by conduits 118 and 98. The remaining vapors recovered in drum 116 are withdrawn by conduit 120, combined with the gaseous material in conduit 86 and sent to fuel gas. Suitable reboiler heat for stripping is obtained by reboiler 122 having suitable interconnecting conduits 124 and 126. Generally, the stripper is designed to operate at The table above presents the results of seven different methods of operation wherein the first six operations evaluated the use of a commercially available hydrogenating catalyst such as a platinum-alumina catalyst comprising about 0.6% by weight platinum which was used in alternate layers of varying thickness with an inert bed of granular material between the catalyst beds for cooling of the highly exothermic reaction. In addition to the inert bed of materials, recycle gas, recycle liquid and recycle gas plus liquid was also employed in an attempt to control the reaction temperature within limits which would substantially limit the formation of undesired MCP (methylcyclopentane). It is clear from the table that these first six methods of operation were not satisfactory in view of the high yields of MCP obtained therein. However, in operation 7 employing the dilute catalyst in accordance with this invention, an extremely small amount of MCP was formed when about 52% of the benzene fresh feed had been converted to the desired cyclohexane product. This obviously amounts to a major contribution to the prior art.

In addition to the above, applicants found that after completing the dilute catalyst treating phase the total effluent containing product and unconverted reactant material could then be successfully passed in contact with a more concentrated hydrogenating catalyst to complete the conversion of unreacted benzene to desired product without encountering uncontrollable reaction temperatures. Accordingly, applicants' specific and improved sequence of steps for effecting the exothermic conversion of hydrocarbon reactants to desired products comprises first passing the reactant material in contact with a dilute hydrogenating catalyst in indirect heat exchange with a heat exchange material until at least about 70 to 90% of the reactant is converted to desired products and thereafter contacting the total effluent with a more concentrated hydrogenating catalyst which may or may not be in indirect heat exchange with a heat exchange material. It is preferred, however, that the initial contact with the more concentrated catalyst be effected under heat exchange conditions until at least about 95 to 98% of the reactant is converted to desired products and thereafter passing the total effluent to an adiabatic reactor to complete the conversion of the reactant material.

Having thus provided a description of our invention along with specific examples directed thereto, it should be understood that no undue limitations or restrictions are to be imposed by reason thereof, but that the scope of this invention is defined by the appended claims.

We claim:
1. A process for hydrogenating an aromatic hydrocarbon which comprises passing an aromatic hydrocarbon and hydrogen first in contact with an alumina catalyst comprising less than .06% by weight of a hydrogenating metal component and then in contact with an alumina catalyst comprising at least about 0.1% by weight of a hydrogenating metal component.

2. A process which comprises hydrogenating an aromatic hydrocarbon at a temperature in the range of from about 380° F. to about 680° F., by first contacting the aromatic hydrocarbon and hydrogen with an alumina catalyst comprising not more than about .03% by weight of a hydrogenating metal component and thereafter contacting with an alumina catalyst comprising from about 0.1% to about 1.0% by weight of a hydrogenating metal component.

3. A process for hydrogenating a benzene-rich stream which comprises passing a mixture comprising hydrogen and a benzene-rich stream first in contact with a catalyst comprising less than .06% by weight of platinum and then in contact with a catalyst comprising from about 0.1% to about 1.0% by weight of platinum.

4. A process which comprises hydrogenating a benzene-rich stream at a temperature in the range of from about 380° F. to about 660° F., by first contacting the stream with a catalyst comprising not more than .03% by weight of platinum to convert the major portion of said benzene feed to cyclohexane and thereafter contacting with a catalyst comprising from about 0.1% to about 0.6% by weight of platinum.

5. A method for producing cyclohexane which comprises passing a benzene-rich stream and hydrogen in contact with a catalyst comprising alumina promoted with from about .006% to about .06% by weight of platinum to convert a portion of said benzene to cyclohexane, and thereafter contacting with a catalyst comprising alumina promoted with from about 0.1% to about 1.0% by weight of platinum.

6. A method for hydrogenating benzene to cyclohexane which comprises passing benzene and hydrogen through a tubular reaction zone at a temperature in the range of from about 380° F. to about 660° F., said tubular reaction zone being in indirect heat exchange with a heat exchange medium and the tubes of said tubular reaction zone being filled with an alumina catalyst promoted with from about .006% to about 1.0% by weight of platinum with the highest platinum concentration present in the downstream portion of the tubes.

7. A method for hydrogenating benzene which comprises passing a benzene-rich stream and hydrogen through a plurality of parallel arranged tubular reaction zones filled with an alumina catalyst promoted with less than .06% by weight platinum at a temperature in the range of from about 450° F. to about 660° F., to convert a portion of said benzene feed to cyclohexane, and thereafter passing the effluent from the tubular reaction zone through an adiabatic reaction zone containing an alumina catalyst promoted with from about 0.1 to about 1.0% by weight of platinum.

8. A method for hydrogenating a benzene-rich stream to produce cyclohexane which comprises passing a benzene-rich stream and hydrogen at a temperature below about 660° F., through a plurality of parallel arranged tubular reaction zones in indirect heat exchange with a heat exchange medium and then through an adiabatic reaction zone, the first portion of said tubular reaction zones in the direction of flow being filled with a hydrogenating catalyst comprising not more than about .06% by weight of a hydrogenating metal component with the remaining portion of said tubular reaction zones filled with a hydrogenating catalyst comprising not more than about .6% by weight of a hydrogenating metal component and said adiabatic reaction zone containing a bed of hydrogenating catalyst comprising from about 0.1% to about 1.0% by weight of a hydrogenating metal component.

References Cited in the file of this patent

UNITED STATES PATENTS

| | | |
|---|---|---|
| 2,303,075 | Frey | Nov. 24, 1942 |
| 2,515,279 | Van Der Hoeven | July 18, 1950 |
| 2,755,317 | Kassel | July 17, 1956 |
| 2,826,555 | Smith | Mar. 11, 1958 |